United States Patent [19]

Krumscheid

[11] Patent Number: 4,846,511
[45] Date of Patent: Jul. 11, 1989

[54] FLEXIBLE CONNECTING BELL FOR PIPES

[76] Inventor: G/nter Krumscheid, Halinger Dorfstr. 83, D-5750, Menden 1, Fed. Rep. of Germany

[21] Appl. No.: 196,308

[22] Filed: May 20, 1988

[30] Foreign Application Priority Data

May 26, 1987 [DE] Fed. Rep. of Germany ....... 3717699

[51] Int. Cl.$^4$ ............................................. F16L 21/00
[52] U.S. Cl. ..................................... 285/235; 285/318
[58] Field of Search ................. 285/307, 318, 244, 235

[56] References Cited

U.S. PATENT DOCUMENTS

| 1,280,170 | 10/1918 | Crawford | 285/235 X |
| 2,001,835 | 5/1935 | Cook | 285/235 X |
| 2,346,051 | 4/1944 | Seamurk | 285/318 X |
| 2,503,093 | 4/1950 | Buchanan | 285/318 |

FOREIGN PATENT DOCUMENTS

| 781481 | 11/1980 | U.S.S.R. | 285/235 |
| 627278 | 8/1949 | United Kingdom | 285/235 |

Primary Examiner—Dave W. Arola
Attorney, Agent, or Firm—Marmorek, Guttman & Rubenstein

[57] ABSTRACT

The invention relates to a flexible connecting bell for pipes. At the joint abutment of the two pipes 1,2 a helical spring 3, designed as a tension spring and with adjacent windings, is fitted on the two pipes 1,2. This helical spring 3 is embedded in an outer sealing sleeve 4, which rests directly on the outside of the pipe ends 1,2 with internal sealing collars 5,6. The helical spring resting directly on the pipe ends 1,2 makes possible a fast, tight connection of the pipes without screw connections and clips. The helical spring protects the flexible material of the sealing sleeve against the direct action of great heat of the medium to be conducted.

2 Claims, 1 Drawing Sheet

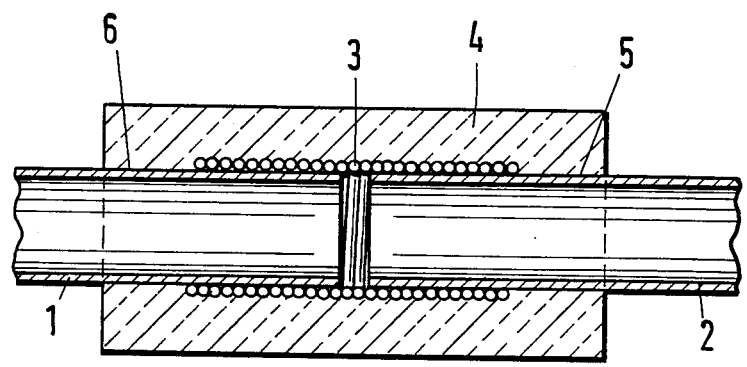

4,846,511

FLEXIBLE CONNECTING BELL FOR PIPES

BACKGROUND OF THE INVENTION

1. Field of the invention

The invention relates to a flexible connecting bell for pipes, consisting of a flexible sealing sleeve and a helical spring, which is arranged concentrically to the latter, is designed as a tension spring, has adjacent windings and the inside diameter of which widens or contracts upon opposite twisting of the pipe ends located in the bell, depending on the direction of rotation.

Such a connecting bell is intended for the purpose of being able to connect quickly and gastightly, but also to release quickly, pipes without threaded couplings and without the use of sealing means and without clips.

2. Discussion of Prior Art

In the case of a known connecting bell of this (German Specification No. 806,817), the sealing sleeve also rests directly on the pipe at the joint abutment of the two pipe ends. This sealing sleeve is surrounded by one or more spring windings, which for their part are surrounded by pipe sleeves divided transversely in the centre, the half-parts of which can be twisted oppositely, so that a large radial contact pressure can be exerted on the sealing sleeve. A helical spring with adjacent windings, surrounding the sleeves, has the effect of blocking the sleeves in their twisted position.

The structure of such a connecting bell is complicated due to the many individual parts. The inner sealing sleeve is also not protected against the direct action of the fluid to be conducted through the pipes. In the case of a hot fluid, such as for example, combustion gases of an internal combustion engine, a particularly heat-resistant material is required in order that the sealing sleeve is not damaged by the hot gases. Due to the multi-layered structure, the connecting bell is also relatively voluminous.

SUMMARY OF THE INVENTION

The object of the invention is to create a structurally simple connecting bell of small design which is suitable for the conduction of hot gases.

This object is achieved according to the invention in the case of a connecting bell of the type mentioned at the beginning in that the helical spring is arranged in the middle axial region of the sealing sleeve, openly against the inside of the latter, and the overhanging ends of the sealing sleeve have sealing collars, which have essentially the same inside diameter as the helical spring.

The connecting bell according to the invention is structurally simple, since it consists only of the two parts of the helical spring and of the sealing sleeve. Since the helical spring rests directly on the pipe ends, the pipe ends can be both easily fitted together and rleased by a screwing movement widening the helical spring. Without screwing movement, a release is not possible because a pure drawing movement has the effect of reducing the free diameter of the helical spring and thus of the helical spring clamping on the pipe ends. The direct resting of the helical spring on the pipe ends has the further effect that it shields the sealing sleeve arranged on the outside of it against the direct action of the medium to be conducted. In the case of a hot medium, the heat is led away into the pipe ends, so that an accumulation of heat and consequently an overheating of the sealing sleeve cannot occur. The sealing function is performed by the sealing collars resting directly on the pipe ends. Since no clips or the like are required for the clamping and the bell consists only of two parts, it can also be installed where only little free space is available.

According to a development of the invention, sealing sleeve and sealing collars are designed in one piece. In this case, the helical spring lies in an internal, axially wide groove.

DESCRIPTION OF AN EMBODIMENT OF THE INVENTION

The invention is explained in more detail below with reference to a drawing representing an exemplary embodiment.

DETAILED DESCRIPTION OF THE EMBODIMENT OF THE INVENTION

The connection bell for the ends 1,2 of pipes consists of a helical spring 3, resting directly on the pipe ends 1,2 and a sealing sleeve 4.

The helical spring 3 is designed as a tension spring, its windings are closely adjacent. The helical spring extends over the joint abutment of the two pipe ends 1,2.

The sealing sleeve 4 has, at its ends, two sealing collars 5,6, which rest directly on the pipe ends 1,2. Between these two sealing collars 5,6 the helical spring 3 lies in an internal groove or is injection-moulded in place during the production of the sealing sleeve 4.

Both the helical spring 3 and the sealing collars 5,6 have a slight undersize in comparison with the pipe ends 1,2 in order that, with inserted pipe ends 1,2 a clamping effect is produced by the helical spring 3 and a sealing effect by the sealing collars 5,6. Since the material of the sealing sleeve 4 is not exposed in the region of the joint abutment of the two pipe ends 1,2, but is shielded by the closely adjacent windings of the helical spring 3 connected thermally conductively to the pipe ends 1,2 the material of the sealing sleeve 4, which is particularly at risk from the effect of high temperatures, is protected. Due to the utilization of both the clamping effect and the shielding effect of the helical spring 3, the requirement for a simple structure is met. The gastight sealing can therefore be moved into the region of the heat-dissipating pipe ends 1,2.

As well as these advantages, the connecting bell according to the invention is characterized in particular in that the bell is not only structurally simple but is also of a compact design, because no clips or other parts are necessary for fastening and sealing.

What is claimed is:

1. A flexible bell for connecting the ends of two pipes, comprising
   a helical spring mounted on said pipe ends,
   said helical spring being in the form of a tension spring with closely adjacent windings, said helical spring having an inner diameter which is no greater than the outer diameter of said pipe ends so as to tightly receive said pipe ends, said inner diameter of said helical spring increasing when said pipe ends are opposingly twisted in one sense and contracting when said pipe ends are opposingly twisted in an opposite sense, and
   a flexible preformed sealing sleeve mounted over said helical spring and on said pipe ends, said helical spring being positioned between said sealing sleeve and said pipe ends so that said closely adjacent windings shield said sealing sleeve from said pipe ends, said sealing sleeve including overhanging ends which extend beyond said helical spring and comprise sealing collars mounted on said pipe ends, said sealing collars having inner diameters substantially the same as the inner diameter of said helical spring.

2. The flexible bell of claim 1 wherein said sealing collars are integral with said sealing sleeve.

* * * * *